(12) United States Patent
Moskowitz et al.

(10) Patent No.: US 9,258,116 B2
(45) Date of Patent: *Feb. 9, 2016

(54) SYSTEM AND METHODS FOR PERMITTING OPEN ACCESS TO DATA OBJECTS AND FOR SECURING DATA WITHIN THE DATA OBJECTS

(71) Applicant: BLUE SPIKE, INC., Sunny Isles Beach, FL (US)

(72) Inventors: Scott A. Moskowitz, Ft. Lauderdale, FL (US); Mike W. Berry, Seattle, WA (US)

(73) Assignee: WISTARIA TRADING LTD, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,559

(22) Filed: May 7, 2014

(65) Prior Publication Data

US 2014/0241524 A1    Aug. 28, 2014

Related U.S. Application Data

(63) Continuation of application No. 13/794,742, filed on Mar. 11, 2013, now Pat. No. 8,798,268, which is a continuation of application No. 13/572,641, filed on Aug. 11, 2012, now Pat. No. 8,767,962, which is a (Continued)

(51) Int. Cl.
*H04K 1/00* (2006.01)
*H04L 9/08* (2006.01)

(Continued)

(52) U.S. Cl.
CPC .......... *H04L 9/0861* (2013.01); *G11B 20/0021* (2013.01); *G11B 20/0071* (2013.01);

(Continued)

(58) Field of Classification Search
None
See application file for complete search history.

(56) References Cited

U.S. PATENT DOCUMENTS 3,947,825 A   3/1976   Cassada
3,984,624 A   10/1976  Waggener (Continued)

FOREIGN PATENT DOCUMENTS

EP   0372601   6/1990
EP   0565947   10/1993

(Continued)

OTHER PUBLICATIONS

EPO Application No. 96919405.9, entitled "Steganographic Method and Device"; published as EP0872073 (A2), Oct. 21, 1998.

(Continued)

*Primary Examiner* — Brandon Hoffman
(74) *Attorney, Agent, or Firm* — Neifeld IP Law, PC

(57) ABSTRACT

A system and methods for permitting open access to data objects and for securing data within the data objects is disclosed. According to one embodiment of the present invention, a method for securing a data object is disclosed. According to one embodiment of the present invention, a method for securing a data object is disclosed. The method includes the steps of (1) providing a data object comprising digital data and file format information; (2) embedding independent data into a data object; and (3) scrambling the data object to degrade the data object to a predetermined signal quality level. The steps of embedding and scrambling may be performed until a predetermined condition is met. The method may also include the steps of descrambling the data object to upgrade the data object to a predetermined signal quality level, and decoding the embedded independent data.

20 Claims, 2 Drawing Sheets

Related U.S. Application Data continuation of application No. 12/886,732, filed on Sep. 21, 2010, now Pat. No. 8,265,278, which is a continuation of application No. 12/383,879, filed on Mar. 30, 2009, now Pat. No. 7,813,506, which is a continuation of application No. 11/647,861, filed on Dec. 29, 2006, now Pat. No. 7,532,725, which is a continuation of application No. 09/731,039, filed on Dec. 7, 2000, now Pat. No. 7,177,429.

(60) Provisional application No. 60/169,274, filed on Dec. 7, 1999, provisional application No. 60/234,199, filed on Sep. 20, 2000.

(51) Int. Cl.

| | | |
|---|---|---|
| *G11B 20/00* | (2006.01) | |
| *H04L 29/06* | (2006.01) | |
| *H04N 7/167* | (2011.01) | |
| *H04N 21/2343* | (2011.01) | |
| *H04N 21/2347* | (2011.01) | |
| *H04N 21/2389* | (2011.01) | |
| *H04N 21/44* | (2011.01) | |
| *H04N 21/4405* | (2011.01) | |
| *H04N 21/8358* | (2011.01) | |
| *H04L 9/00* | (2006.01) | |
| *H04N 19/467* | (2014.01) | |

(52) U.S. Cl.
CPC .... *G11B20/00086* (2013.01); *G11B 20/00818* (2013.01); *G11B 20/00891* (2013.01); *G11B 20/00985* (2013.01); *H04L 9/00* (2013.01); *H04L 63/0428* (2013.01); *H04N 7/1675* (2013.01); *H04N 19/467* (2014.11); *H04N 21/2343* (2013.01); *H04N 21/2347* (2013.01); *H04N 21/23476* (2013.01); *H04N 21/23892* (2013.01); *H04N 21/4405* (2013.01); *H04N 21/44008* (2013.01); *H04N 21/8358* (2013.01); *G11B 2020/00014* (2013.01); *H04L 63/12* (2013.01); *H04L 2209/34* (2013.01)

(56) References Cited

U.S. PATENT DOCUMENTS

| | | | |
|---|---|---|---|
| 3,986,624 | A | 10/1976 | Cates, Jr. et al. |
| 4,038,596 | A | 7/1977 | Lee |
| 4,200,770 | A | 4/1980 | Hellman et al. |
| 4,218,582 | A | 8/1980 | Hellman et al. |
| 4,339,134 | A | 7/1982 | Macheel |
| 4,390,898 | A | 6/1983 | Bond et al. |
| 4,405,829 | A | 9/1983 | Rivest et al. |
| 4,424,414 | A | 1/1984 | Hellman et al. |
| 4,528,588 | A | 7/1985 | Lofberg |
| 4,633,462 | A | 12/1986 | Stifle |
| 4,672,605 | A | 6/1987 | Hustig et al. |
| 4,748,668 | A | 5/1988 | Shamir et al. |
| 4,789,928 | A | 12/1988 | Fujisaki |
| 4,827,508 | A | 5/1989 | Shear |
| 4,876,617 | A | 10/1989 | Best et al. |
| 4,896,275 | A | 1/1990 | Jackson |
| 4,908,873 | A | 3/1990 | Philibert et al. |
| 4,939,515 | A | 7/1990 | Adelson |
| 4,969,204 | A | 11/1990 | Melnychuk et al. |
| 4,972,471 | A | 11/1990 | Gross et al. |
| 4,977,594 | A | 12/1990 | Shear |
| 4,979,210 | A | 12/1990 | Nagata et al. |
| 4,980,782 | A | 12/1990 | Ginkel |
| 5,050,213 | A | 9/1991 | Shear |
| 5,073,925 | A | 12/1991 | Nagata et al. |
| 5,077,665 | A | 12/1991 | Silverman et al. |
| 5,103,461 | A | 4/1992 | Cain |
| 5,111,530 | A | 5/1992 | Kutaragi |
| 5,113,437 | A | 5/1992 | Best et al. |
| 5,123,045 | A | 6/1992 | Ostrovsky |
| 5,136,581 | A | 8/1992 | Muehrcke |
| 5,136,646 | A | 8/1992 | Haber et al. |
| 5,136,647 | A | 8/1992 | Haber et al. |
| 5,142,576 | A | 8/1992 | Nadan |
| 5,161,210 | A | 11/1992 | Druyvesteyn et al. |
| 5,189,411 | A | 2/1993 | Collar |
| 5,210,820 | A | 5/1993 | Kenyon |
| 5,243,423 | A | 9/1993 | DeJean et al. |
| 5,243,515 | A | 9/1993 | Lee |
| 5,287,407 | A | 2/1994 | Holmes |
| 5,293,633 | A | 3/1994 | Robbins |
| 5,297,032 | A | 3/1994 | Trojan |
| 5,319,735 | A | 6/1994 | Preuss et al. |
| 5,327,520 | A | 7/1994 | Chen |
| 5,341,429 | A | 8/1994 | Stringer et al. |
| 5,341,477 | A | 8/1994 | Pitkin et al. |
| 5,363,448 | A | 11/1994 | Koopman et al. |
| 5,365,586 | A | 11/1994 | Indeck et al. |
| 5,369,707 | A | 11/1994 | Follendore, III |
| 5,375,055 | A | 12/1994 | Togher |
| 5,379,345 | A | 1/1995 | Greenberg |
| 5,394,324 | A | 2/1995 | Clearwater |
| 5,398,285 | A | 3/1995 | Borgelt et al. |
| 5,406,627 | A | 4/1995 | Thompson et al. |
| 5,408,505 | A | 4/1995 | Indeck et al. |
| 5,410,598 | A | 4/1995 | Shear |
| 5,412,718 | A | 5/1995 | Narasimhalu et al. |
| 5,418,713 | A | 5/1995 | Allen |
| 5,428,606 | A | 6/1995 | Moskowitz |
| 5,437,050 | A | 7/1995 | Lamb |
| 5,450,490 | A | 9/1995 | Jensen et al. |
| 5,469,536 | A | 11/1995 | Blank |
| 5,471,533 | A | 11/1995 | Wang et al. |
| 5,478,990 | A | 12/1995 | Montanari et al. |
| 5,479,210 | A | 12/1995 | Cawley et al. |
| 5,487,168 | A | 1/1996 | Geiner et al. |
| 5,493,677 | A | 2/1996 | Balogh et al. |
| 5,497,419 | A | 3/1996 | Hill |
| 5,506,795 | A | 4/1996 | Yamakawa |
| 5,513,126 | A | 4/1996 | Harkins et al. |
| 5,513,261 | A | 4/1996 | Maher |
| 5,530,739 | A | 6/1996 | Okada |
| 5,530,751 | A | 6/1996 | Morris |
| 5,530,759 | A | 6/1996 | Braudaway et al. |
| 5,539,735 | A | 7/1996 | Moskowitz |
| 5,548,579 | A | 8/1996 | Lebrun et al. |
| 5,568,570 | A | 10/1996 | Rabbani |
| 5,579,124 | A | 11/1996 | Aijala et al. |
| 5,581,703 | A | 12/1996 | Baugher et al. |
| 5,583,488 | A | 12/1996 | Sala et al. |
| 5,598,470 | A | 1/1997 | Cooper et al. |
| 5,606,609 | A | 2/1997 | Houser et al. |
| 5,613,004 | A | 3/1997 | Cooperman et al. |
| 5,617,119 | A | 4/1997 | Briggs et al. |
| 5,617,506 | A | 4/1997 | Burk |
| 5,625,690 | A | 4/1997 | Michel et al. |
| 5,629,980 | A | 5/1997 | Stefik et al. |
| 5,633,932 | A | 5/1997 | Davis et al. |
| 5,634,040 | A | 5/1997 | Her et al. |
| 5,636,276 | A | 6/1997 | Brugger |
| 5,636,292 | A | 6/1997 | Rhoads |
| 5,640,569 | A | 6/1997 | Miller et al. |
| 5,644,727 | A | 7/1997 | Atkins |
| 5,646,997 | A | 7/1997 | Barton |
| 5,649,284 | A | 7/1997 | Yoshinobu |
| 5,657,461 | A | 8/1997 | Harkins et al. |
| 5,659,726 | A | 8/1997 | Sandford, II et al. |
| 5,664,018 | A | 9/1997 | Leighton |
| 5,673,316 | A | 9/1997 | Auerbach et al. |
| 5,675,653 | A | 10/1997 | Nelson |
| 5,677,952 | A | 10/1997 | Blakley et al. |
| 5,680,462 | A | 10/1997 | Miller et al. |
| 5,687,236 | A | 11/1997 | Moskowitz et al. |
| 5,689,587 | A | 11/1997 | Bender et al. |
| 5,696,828 | A | 12/1997 | Koopman, Jr. |
| 5,719,937 | A | 2/1998 | Warren et al. |
| 5,721,781 | A | 2/1998 | Deo |

(56) References Cited

U.S. PATENT DOCUMENTS

| | | |
|---|---|---|
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,748,783 A | 5/1998 | Rhoads |
| 5,751,811 A | 5/1998 | Magnotti et al. |
| 5,754,697 A | 5/1998 | Fu et al. |
| 5,754,938 A | 5/1998 | Herz |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,781,184 A | 7/1998 | Wasserman |
| 5,790,677 A | 8/1998 | Fox et al. |
| 5,799,083 A | 8/1998 | Brothers et al. |
| 5,809,139 A | 9/1998 | Girod et al. |
| 5,809,160 A | 9/1998 | Powell et al. |
| 5,818,818 A | 10/1998 | Soumiya |
| 5,822,432 A | 10/1998 | Moskowitz et al. |
| 5,822,436 A | 10/1998 | Rhoads |
| 5,828,325 A | 10/1998 | Wolosewicz et al. |
| 5,832,119 A | 11/1998 | Rhoads |
| 5,839,100 A | 11/1998 | Wegener |
| 5,842,213 A | 11/1998 | Odom |
| 5,845,266 A | 12/1998 | Lupien |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,864,827 A | 1/1999 | Wilson |
| 5,870,474 A | 2/1999 | Wasilewski et al. |
| 5,875,437 A | 2/1999 | Atkins |
| 5,884,033 A | 3/1999 | Duvall et al. |
| 5,889,868 A | 3/1999 | Moskowitz et al. |
| 5,892,900 A | 4/1999 | Ginter |
| 5,893,067 A | 4/1999 | Bender et al. |
| 5,894,521 A | 4/1999 | Conley |
| 5,901,178 A | 5/1999 | Lee |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,949,973 A | 9/1999 | Yarom |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,018,722 A | 1/2000 | Ray |
| 6,029,126 A | 2/2000 | Malvar |
| 6,029,146 A | 2/2000 | Hawkins |
| 6,029,195 A | 2/2000 | Herz |
| 6,032,957 A | 3/2000 | Kiyosaki |
| 6,035,398 A | 3/2000 | Bjorn |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |
| 6,108,722 A | 8/2000 | Troeller |
| 6,131,162 A | 10/2000 | Yoshiura et al. |
| 6,134,535 A | 10/2000 | Belzberg |
| 6,138,239 A | 10/2000 | Veil |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,173,322 B1 | 1/2001 | Hu |
| 6,178,405 B1 | 1/2001 | Ouyang |
| 6,185,683 B1 | 2/2001 | Ginter |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florencio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,566 B1 | 5/2001 | Levine |
| 6,233,684 B1 | 5/2001 | Stefik et al. |
| 6,240,121 B1 | 5/2001 | Senoh |
| 6,253,193 B1 | 6/2001 | Ginter |
| 6,263,313 B1 | 7/2001 | Milsted et al. |
| 6,272,474 B1 | 8/2001 | Garcia |
| 6,272,535 B1 * | 8/2001 | Iwamura ..................... 709/217 |
| 6,272,634 B1 | 8/2001 | Tewfik et al. |
| 6,275,988 B1 * | 8/2001 | Nagashima et al. ............. 725/8 |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,317,728 B1 | 11/2001 | Kane |
| 6,324,649 B1 | 11/2001 | Eyres |
| 6,330,335 B1 | 12/2001 | Rhoads |
| 6,330,672 B1 * | 12/2001 | Shur ............................ 713/176 |
| 6,345,100 B1 | 2/2002 | Levine |
| 6,351,765 B1 | 2/2002 | Pietropaolo et al. |
| 6,363,483 B1 | 3/2002 | Keshav |
| 6,363,488 B1 | 3/2002 | Ginter |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,402 B1 | 5/2002 | Ginter |
| 6,389,538 B1 | 5/2002 | Gruse et al. |
| 6,398,245 B1 | 6/2002 | Gruse |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,427,140 B1 | 7/2002 | Ginter |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,480,937 B1 | 11/2002 | Vorbach |
| 6,480,963 B1 | 11/2002 | Tachibana |
| 6,484,153 B1 | 11/2002 | Walker |
| 6,484,264 B1 | 11/2002 | Colvin |
| 6,493,457 B1 | 12/2002 | Quackenbush |
| 6,502,195 B1 | 12/2002 | Colvin |
| 6,510,513 B1 | 1/2003 | Darrow |
| 6,522,767 B1 | 2/2003 | Moskowitz et al. |

(56) References Cited

U.S. PATENT DOCUMENTS

| | | |
|---|---|---|
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,556,976 B1 | 4/2003 | Callen |
| 6,557,103 B1 | 4/2003 | Boncelet, Jr. et al. |
| 6,574,608 B1 | 6/2003 | Dahod |
| 6,584,125 B1 | 6/2003 | Katto |
| 6,587,837 B1 | 7/2003 | Spagna et al. |
| 6,590,996 B1 | 7/2003 | Reed |
| 6,594,643 B1 | 7/2003 | Freeny |
| 6,598,162 B1 | 7/2003 | Moskowitz |
| 6,601,044 B1 | 7/2003 | Wallman |
| 6,606,393 B1 | 8/2003 | Xie et al. |
| 6,611,599 B2 | 8/2003 | Natarajan |
| 6,615,188 B1 | 9/2003 | Breen |
| 6,618,188 B2 | 9/2003 | Haga |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,778,968 B1 | 8/2004 | Gulati |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,804,453 B1 | 10/2004 | Sasamoto |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,839,686 B1 | 1/2005 | Galant |
| 6,842,862 B2 | 1/2005 | Chow et al. |
| 6,853,726 B1 | 2/2005 | Moskowitz et al. |
| 6,856,967 B1 | 2/2005 | Woolston |
| 6,857,078 B2 | 2/2005 | Colvin |
| 6,865,747 B1 | 3/2005 | Mercier |
| 6,876,982 B1 | 4/2005 | Lancaster |
| 6,931,534 B1 | 8/2005 | Jandel et al. |
| 6,950,941 B1 | 9/2005 | Lee |
| 6,957,330 B1 | 10/2005 | Hughes |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |
| 6,983,058 B1 | 1/2006 | Fukuoka |
| 6,986,063 B2 | 1/2006 | Colvin |
| 6,990,453 B2 | 1/2006 | Wang |
| 7,003,480 B2 | 2/2006 | Fox |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,715 B2 | 8/2006 | Buckman |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Bums |
| 7,233,669 B2 | 6/2007 | Candelore |
| 7,240,210 B2 | 7/2007 | Mihcak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,310,815 B2 | 12/2007 | Yanovsky |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,444,506 B1 | 10/2008 | Datta |
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,630,379 B2 | 12/2009 | Morishita |
| 7,647,502 B2 | 1/2010 | Moskowitz |
| 7,647,503 B2 | 1/2010 | Moskowitz |
| 7,664,263 B2 | 2/2010 | Moskowitz |
| 7,719,966 B2 | 5/2010 | Luft |
| 7,743,001 B1 | 6/2010 | Vermeulen |
| 7,761,712 B2 | 7/2010 | Moskowitz |
| 7,779,261 B2 | 8/2010 | Moskowitz |
| 8,095,949 B1 | 1/2012 | Hendricks |
| 8,121,343 B2 | 2/2012 | Moskowitz |
| 8,161,286 B2 | 4/2012 | Moskowitz |
| 8,179,846 B2 | 5/2012 | Dolganow |
| 8,214,175 B2 | 7/2012 | Moskowitz |
| 8,265,278 B2 | 9/2012 | Moskowitz |
| 8,307,213 B2 | 11/2012 | Moskowitz |
| 8,400,566 B2 | 3/2013 | Terry |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0047873 A1 | 4/2002 | Imanaka |
| 2002/0056041 A1 | 5/2002 | Moskowitz |
| 2002/0057651 A1 | 5/2002 | Roberts |
| 2002/0069174 A1 | 6/2002 | Fox |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0152179 A1 | 10/2002 | Racov |
| 2002/0161741 A1 | 10/2002 | Wang et al. |
| 2002/0188570 A1* | 12/2002 | Holliman et al. ............... 705/57 |
| 2003/0002862 A1 | 1/2003 | Rodriguez |
| 2003/0005780 A1 | 1/2003 | Hansen |
| 2003/0023852 A1 | 1/2003 | Wold |
| 2003/0027549 A1 | 2/2003 | Kiel |
| 2003/0033321 A1 | 2/2003 | Schrempp |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |

(56) References Cited

U.S. PATENT DOCUMENTS

| | | |
|---|---|---|
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005572 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2010/0002904 A1 | 1/2010 | Moskowitz |
| 2010/0005308 A1 | 1/2010 | Moskowitz |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Chota |
| 2010/0202607 A1 | 8/2010 | Moskowitz |
| 2010/0220861 A1 | 9/2010 | Moskowitz |
| 2010/0313033 A1 | 12/2010 | Moskowitz |
| 2011/0019691 A1 | 1/2011 | Moskowitz |
| 2011/0069864 A1 | 3/2011 | Moskowitz |
| 2011/0128445 A1 | 6/2011 | Carrieres |
| 2012/0057012 A1 | 3/2012 | Sitrick |
| 2013/0145058 A1 | 6/2013 | Shuholm |

FOREIGN PATENT DOCUMENTS

| | | |
|---|---|---|
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1547337 | 3/2006 |
| EP | 1354276 | 12/2007 |
| NL | 1005523 | 9/1998 |
| WO | WO 9514289 | 5/1995 |
| WO | WO 9629795 | 9/1996 |
| WO | WO 9642151 | 12/1996 |
| WO | WO9701892 | 1/1997 |
| WO | WO9726733 | 1/1997 |
| WO | WO 9724833 | 7/1997 |
| WO | WO9726732 | 7/1997 |
| WO | WO 9744736 | 11/1997 |
| WO | WO9802864 | 1/1998 |
| WO | WO9837513 | 8/1998 |
| WO | WO 9952271 | 10/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO023385 A1 | 10/2002 |

OTHER PUBLICATIONS

Jap. App. No. 2000-542907, entitled "Multiple Transform Utilization and Application for Secure Digital Watermarking"; which is a JP national stage of PCT/US1999/007262, published as WO/1999/052271, Oct. 14, 1999.

PCT Application No. PCT/US00/21189, filed Aug. 4, 2000, entitled, "A Secure Personal Content Server", Pub. No. WO/2001/018628 ; Publication Date: Mar. 15, 2001.

Schneier, Bruce, Applied Cryptography, 2nd Ed., John Wiley & Sons, pp. 9-10, 1996.

Menezes, Alfred J., Handbook of Applied Cryptography, CRC Press, p. 46, 1997.

Merriam-Webster's Collegiate Dictionary, 10th Ed., Merriam Webster, Inc., p. 207.

Brealy, et al., Principles of Corporate Finance, "Appendix A—Using Option Valuation Models", 1984, pp. 448-449.

Copeland, et al., Real Options: A Practitioner's Guide, 2001 pp. 106-107, 201-202, 204-208.

Sarkar, M. "An Assessment of Pricing Mechanisms for the Internet-A Regulatory Imperative", presented MIT Workshop on Internet Economics, Mar. 1995 http://www.press.vmich.edu/iep/works/SarkAsses.html on.

Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.

Zhao, Jian. "A WWW Service to Embed and Prove Digital Copyright Watermarks", Proc. of the European conf. on Multimedia Applications, Services & Techniques Louvain-La-Nevve Belgium May 1996.

Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J. AudioEng. Sc., vol. 43, No. 1/2, pp. 23-28 (1995).

Ten Kate, W. et al., A New Surround-Stereo-Surround Coding Techniques, J. Audio Eng.Soc., vol. 40,No. 5,pp. 376-383 (1992).

Gerzon, Michael et al., A High Rate Buried Data Channel for Audio CD, presentation notes, Audio Engineering Soc. 94th Convention (1993).

Sklar, Bernard, Digital Communications, pp. 601-603 (1988).

Jayant, N.S. et al., Digital Coding of Waveforms, Prentice Hall Inc., Englewood Cliffs, NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

(56) References Cited

OTHER PUBLICATIONS

Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft the Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.
Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.
Lemma, et al. "Secure Watermark Embedding through Partial Encryption, International Workshop on Digital Watermarking" ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages.
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.
Schunter, M. et al., "A Status Report on the Semper framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
STAIND (The Singles 1996-2006), Warner Music—Atlantic, Pre-Release CD image, 2006, 1 page.
Radiohead ("Hail to the Thief"), EMI Music Group—Capitol, Pre-Release CD image, 2003, 1 page.
U.S. Appl. No. 60/169,274, filed Dec. 7, 1999, entitled "Systems, Methods and Devices for Trusted Transactions".
U.S. Appl. No. 60/234,199, filed Sep. 20, 2000, "Improved Security Based on Subliminal and Supraliminal Channels for Data Objects".
U.S. Appl. No. 09/671,739, filed Sep. 29, 2000, entitled "Method and Device for Monitoring and Analyzing Signals".
Tirkel, A.Z., "A Two-Dimensional Digital Watermark", Scientific Technology, 686, 14, date unknown.
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.

(56) References Cited

OTHER PUBLICATIONS

Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
OASIS (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP5002 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd Euromicro Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
PCT Application No. PCT/US95/08159, filed Jun. 26, 1995, entitled, "Digital Information Commodities Exchange with Virtual Menuing", published as WO/1997/001892; Publication Date: Jan. 16, 1997.
PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.

PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
EPO Divisional Patent Application No. 07112420.0, entitled "Steganographic Method and Device" corresponding to PCT Application No. PCT/US96/10257, published as WO/1996/042151, Dec. 27, 1996.
U.S. Appl. No. 60/222,023, filed Jul. 31, 2007 entitled "Method and apparatus for recognizing sound and signals in high noise and distortion".
"Techniques for Data Hiding in Audio Files," by Morimoto, 1995.
Howe, Dennis Jul. 13, 1998 http://foldoc.org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham.com/pubs/hacking-dict.html.
Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.
U. are U. Reviewer's Guide (U are U Software, 1998).
U. are U. wins top honors!—Marketing Flyer (U. are U. Software, 1998).
Digital Persona, Inc., *U. are U. Fingerprint Recognition System: User Guide*(Version 1.0, 1998).
Digital Persona White Paper pp. 8-9 published Apr. 15, 1998.
Digital Persona, Inc., "Digital Persona Releases U. are. U Pro Fingerprint Security Systems for Windows NT, 2000, '98, '95", (Feb. 2000).
SonicWall, Inc. 2011 "The Network Security SonicOS Platform-Deep Packet Inspection" http://www.sonicwall.com/us/en/products/Deep_Packet_Inspection.html.
Rick Merritt, PARC hosts summit on content-centric nets, EETimes, Aug. 12, 2011, http://www.eetimes.com/electronics-news/4218741/PARC-hosts-summit-on-content-centric-nets.
Afanasyev, et. al., Communications of the ACM: Privacy Preserving Network Forensics 2011.
SonicWall, Inc., 2008 "The Advantages of a Multi-core Architecture in Network Security Appliances" http://www.sonicwall.com/downloads/WP-ENG010_Multicore . . . .
Voip-Pal.Com Inc's Lawful Intercept Patent Application Receives the Allowance for Issuance as a Patent, http://finance.yahoo.com/news/voip-pal-com-inc-lawful-133000133.html.
Deep Content Inspection—Wikipedia, the free encyclopedia, http://en.wikipedia.org/wiki/Deep_content_inspection (last visited Apr. 4, 2013).
Dexter, et. al, "Multi-view Synchronization of Human Actions and Dynamic Scenes" pp. 1-11, 2009.
Kudrle, et al., "Fingerprinting for Solving A/V Synchronization Issues within Broadcast Environments", 2011.
Junego, et. al., "View-Independent Action Recognition from Temporal Self-Similarities", 2011.
Dexter, et al., "Multi-view Synchronization of Image Sequences", 2009.
*Blue Spike, LLC. v. Texas Instruments, Inc et. al*, (No: 6:12-CV-499-MHS), Audible Magic Corporations's amended Answer ( E.D. TX filed Jul. 15, 2013) (Document 885 p. ID 9581), (PACER).

(56) References Cited

OTHER PUBLICATIONS

Moskowitz, "Introduction-Digital Rights Management," Multimedia Security Technologies for Digital Rights Management (2006), Elsevier.

George, Mercy; Chouinard, Jean-Yves; Georgana, Nicolas. Digital Watermarking of Images and video using Direct Sequence Spread Spectrum Techniques. 1999 IEEE Canadian Conference on Electrical and Computer Engineering vol. 1. Pub. Date: 1999 Relevant pp. 116-121. http://ieeexplore.ieee.org/stamp/stamp.jsp?tp=arnumber=807181.

Shazam Entertainment Limited's Amended Answer to Blue Spike, LLC's complaint and counterclaims against Blue Spike LLC, Blue Spike, Inc and Scott A. Moskowitz, *Shazam Entertainment Ltd v. Blue Spike, LLC, Blue Spike, Inc, and Scott Moskowitz* (E.D.T.X Dist Ct.) Case No. 6:12-CV-00499-MHS.

Audible Magic Corporation's Second Amended Answer to Blue Spike LLC's Original Complaint for patent infringement and counterclaims against *Blue Spike LLC, Blue Spike, Inc and Scott Moskowitz. Blue Spike LLC v. Texas Instruments, Audible Magic Corporation* (E.D.T.X Dist Ct.) Case No. 6:12-CV-499-MHS.

U.S. Appl. No. 11/599,838, filed Nov. 15, 2006.
U.S. Appl. No. 11/899,662, filed Sep. 7, 2007.
U.S. Appl. No. 10/369,344, filed Feb. 18, 2003.
U.S. Appl. No. 11/482,654, filed Jul. 7, 2006.
U.S. Appl. No. 12/215,812, filed Jun. 30, 2008.
U.S. Appl. No. 12/901,568, filed Oct. 10, 2010.
U.S. Appl. No. 11/497,822, filed Aug. 2, 2006.
U.S. Appl. No. 12/217,834, filed Jul. 9, 2008.
U.S. Appl. No. 11/897,790, filed Aug. 31, 2007.
U.S. Appl. No. 12/462,799, filed Aug. 10, 2009.
U.S. Appl. No. 11/899,661, filed Sep. 7, 2007.
U.S. Appl. No. 12/590,681, filed Nov. 19, 2009.
U.S. Appl. No. 11/897,791, filed Aug. 31, 2007.
U.S. Appl. No. 12/590,553, filed Nov. 10, 2009.
U.S. Appl. No. 12/592,331, filed Nov. 23, 2009.
U.S. Appl. No. 11/599,964, filed Nov. 15, 2006.
U.S. Appl. No. 13/212,264, filed Aug. 18, 2011.
U.S. Appl. No. 08/674,726, filed Jul. 2, 1996.
U.S. Appl. No. 09/545,589, filed Apr. 7, 2000.
U.S. Appl. No. 11/244,213, filed Oct. 5, 2005.
U.S. Appl. No. 12/009,914, filed Jan. 23, 2008.
U.S. Appl. No. 12/005,230, filed Dec. 26, 2007.
U.S. Appl. No. 12/803,168, filed Jun. 21, 2010.
U.S. Appl. No. 11/649,026, filed Jan. 3, 2007.
U.S. Appl. No. 12/803,194, filed Jun. 21, 2010.
U.S. Appl. No. 12/892,900, filed Sep. 28, 2010.
U.S. Appl. No. 08/489,172, filed Jun. 7, 1995.
U.S. Appl. No. 08/775,216, filed Dec. 31, 1996.
U.S. Appl. No. 08/999,766, filed Jul. 23, 1997.
U.S. Appl. No. 11/894,476, filed Aug. 21, 2007.
U.S. Appl. No. 11/050,779, filed Feb. 7, 2005.
U.S. Appl. No. 12/802,519, filed Jun. 8, 2010.
U.S. Appl. No. 12/383,916, filed Mar. 30, 2009.
U.S. Appl. No. 11/894,443, filed Aug. 21, 2007.
U.S. Appl. No. 12/913,751, filed Oct. 27, 2010.
U.S. Appl. No. 13/803,889, filed Mar. 14, 2013.
U.S. Appl. No. 08/587,943, filed Jan. 17, 1996.
U.S. Appl. No. 09/046,627, filed Mar. 24, 1998.
U.S. Appl. No. 10/602,777, filed Jun. 25, 2003.
U.S. Appl. No. 11/512,701, filed Aug. 29, 2006.
U.S. Appl. No. 11/895,388, filed Aug. 24, 2007.
U.S. Appl. No. 12/655,002, filed Dec. 22, 2009.
U.S. Appl. No. 13/556,420, filed Jul. 24, 2012.
U.S. Appl. No. 13/794,584, filed Mar. 12, 2013.
U.S. Appl. No. 09/731,039, filed Dec. 7, 2000.
U.S. Appl. No. 11/647,861, filed Dec. 29, 2006.
U.S. Appl. No. 12/383,879, filed Mar. 30, 2009.
U.S. Appl. No. 12/886,732, filed Sep. 21, 2010.
U.S. Appl. No. 13/572,641, filed Aug. 11, 2012.
U.S. Appl. No. 13/794,742, filed Mar. 12, 2013.
U.S. Appl. No. 14/271,59, filed May 7, 2014.
U.S. Appl. No. 10/049,101, filed Jul. 23, 2002.
U.S. Appl. No. 12/287,443, filed Oct. 9, 2008.
U.S. Appl. No. 13/413,691, filed Mar. 7, 2012.
U.S. Appl. No. 13/796,538, filed Mar. 12, 2013.
U.S. Appl. No. 09/657,181, filed Sep. 7, 2000.
U.S. Appl. No. 12/005,229, filed Dec. 26, 2007.
U.S. Appl. No. 12/655,357, filed Dec. 22, 2009.
U.S. Appl. No. 13/035,964, filed Feb. 26, 2011.
U.S. Appl. No. 13/487,119, filed Jun. 1, 2012.
U.S. Appl. No. 13/802,384, filed Mar. 13, 2013.
U.S. Appl. No. 10/417,231, filed Apr. 17, 2003.
U.S. Appl. No. 11/900,065, filed Sep. 10, 2007.
U.S. Appl. No. 11/900,066, filed Sep. 10, 2007.
U.S. Appl. No. 12/383,289, filed Mar. 23, 2009.
U.S. Appl. No. 13/273,930, filed Oct. 14, 2011.
U.S. Appl. No. 13/551,097, filed Jul. 17, 2012.
U.S. Appl. No. 13/488,357, filed Jun. 4, 2012.
U.S. Appl. No. 13/488,395, filed Jun. 4, 2012.
U.S. Appl. No. 09/053,628, filed Apr. 2, 1998.
U.S. Appl. No. 09/644,098, filed Aug. 23, 2000.
U.S. Appl. No. 11/358,874, filed Feb. 21, 2006.
U.S. Appl. No. 12/799,894, filed May 4, 2010.
U.S. Appl. No. 13/937,106, filed Jul. 8, 2013.
U.S. Appl. No. 14/258,171, filed Apr. 22, 2014.
U.S. Appl. No. 14/258,8118, filed Apr. 22, 2014.
U.S. Appl. No. 09/731,040, filed Dec. 7, 2000.
U.S. Appl. No. 13/826,858, filed Mar. 14, 2013.
U.S. Appl. No. 13/797,744, filed Mar. 12, 2013.
U.S. Appl. No. 09/594,719, filed Jun. 16, 2000.
U.S. Appl. No. 11/519,467, filed Sep. 12, 2006.
U.S. Appl. No. 12/655,036, filed Dec. 22, 2009.
U.S. Appl. No. 13/423,650, filed Mar. 19, 2012.
U.S. Appl. No. 13/802,471, filed Mar. 13, 2013.
U.S. Appl. No. 08/772,222, filed Dec. 20, 1996.
U.S. Appl. No. 09/456,319, filed Dec. 8, 1999.
U.S. Appl. No. 11/826,234, filed Dec. 30, 2004.
U.S. Appl. No. 11/592,879, filed Nov. 2, 2006.
U.S. Appl. No. 12/798,959, filed Apr. 14, 2010.
U.S. Appl. No. 11/518,806, filed Sep. 11, 2006.
U.S. Appl. No. 13/429,396, filed Mar. 25, 2012.
U.S. Appl. No. 61/794,141, filed Mar. 15, 2013.
U.S. Appl. No. 12/383,916.
U.S. Appl. No. 11/900,065.
U.S. Appl. No. 12/799,894.
U.S. Appl. No. 12/287,443.
U.S. Appl. No. 12/803,194.
U.S. Appl. No. 12/655,002.
U.S. Appl. No. 13/035,964.
U.S. Appl. No. 13/413,691.
U.S. Appl. No. 13/556,420.
U.S. Appl. No. 13/488,357.
U.S. Appl. No. 13/802,384.
U.S. Appl. No. 13/826,858.

* cited by examiner

SYSTEM AND METHODS FOR PERMITTING OPEN ACCESS TO DATA OBJECTS AND FOR SECURING DATA WITHIN THE DATA OBJECTS

CROSS-REFERENCE TO RELATED APPLICATIONS

This application is a continuation of U.S. application Ser. No. 13/794,742, filed Mar. 11, 2013, issued as U.S. Pat. No. 8,798,268, which is a continuation of U.S. application Ser. No. 13/572,641, filed Aug. 11, 2012, issued as U.S. Pat. No. 8,767,962, which is a continuation of U.S. application Ser. No. 12/886,732, filed Sep. 21, 2010, issued as U.S. Pat. No. 8,265,278, which is a continuation of U.S. application Ser. No. 12/383,879, filed Mar. 30, 2009, issued as U.S. Pat. No. 7,813,506, which is a continuation of U.S. application Ser. No. 11/647,861, filed Dec. 29, 2006, issued as U.S. Pat. No. 7,532,725, which is a continuation of U.S. application Ser. No. 09/731,039, filed Dec. 7, 2000, issued as U.S. Pat. No. 7,177,429, and U.S. application Ser. No. 09/731,039, filed Dec. 7, 2000, issued as U.S. Pat. No. 7,177,429, claims the benefit of U.S. Provisional Application No. 60/169,274, filed Dec. 7, 1999, and U.S. application Ser. No. 09/731,039, filed Dec. 7, 2000, issued as U.S. Pat. No. 7,177,429, claims the benefit of U.S. Provisional Application No. 60/234,199, filed Sep. 20, 2000. The previously identified patents and/or patent applications are hereby incorporated by reference, in their entireties.

This application is related to U.S. patent application Ser. No. 08/674,726, filed Jul. 2, 1996, entitled "Exchange Mechanisms for Digital Information Packages with Bandwidth Securitization, Multichannel Digital Watermarks, and Key Management", issued as U.S. Pat. No. 7,362,775; U.S. patent application Ser. No. 08/999,766, filed Jul. 23, 1997, entitled "Steganographic Method and Device", issued as U.S. Pat. No. 7,568,100; U.S. patent application Ser. No. 09/046,627, filed Mar. 24, 1998, entitled "Method for Combining Transfer Function with Predetermined Key Creation", issued as U.S. Pat. No. 6,598,162; U.S. patent application Ser. No. 09/053,628, filed Apr. 2, 1998, entitled "Multiple Transform Utilization and Application for Secure Digital Watermarking", issued as U.S. Pat. No. 6,205,249; U.S. patent application Ser. No. 09/281,279, filed Mar. 30, 1999, entitled "Optimization Methods for the Insertion, Protection, and Detection of Digital Watermarks in Digital Data", issued as U.S. Pat. No. 6,522,767; U.S. Provisional Application No. 60/169,274, filed Dec. 7, 1999, entitled "Systems, Methods And Devices For Trusted Transactions"; U.S. patent application Ser. No. 09/456,319, filed Dec. 8, 1999, entitled "Z-Transform Implementation of Digital Watermarks", issued as U.S. Pat. No. 6,853,726; U.S. patent application Ser. No. 09/545,589, filed Apr. 7, 2000, entitled "Method and System for Digital Watermarking", issued as U.S. Pat. No. 7,007,166; U.S. patent application Ser. No. 09/594,719, filed Jun. 16, 2000, entitled "Utilizing Data Reduction in Steganographic and Cryptographic Systems", which is a continuation-in-part of International Application No. PCT/US00/06522, filed Mar. 14, 2000, which PCT application claimed priority to U.S. Provisional Application No. 60/125,990, filed Mar. 24, 1999, issued as U.S. Pat. No. 7,123,718; International Application No. PCT/US00/21189, filed Aug. 4, 2000, which claims priority to U.S. Patent Application No. 60/147,134, filed Aug. 4, 1999, and to U.S. Patent Application No. 60/213,489, filed Jun. 23, 2000, both of which are entitled "A Secure Personal Content Server", U.S. patent application Ser. No. 09/657,181, filed Sep. 7, 2000, entitled "Method And Device For Monitoring And Analyzing Signals"; U.S. Provisional Patent Application No. 60/234,199, filed Sep. 20, 2000, entitled "Improved Security Based on Subliminal and Supraliminal Channels For Data Objects", issued as U.S. Pat. No. 7,127,615; U.S. patent application Ser. No. 09/671,739, filed Sep. 29, 2000, entitled "Method And Device For Monitoring And Analyzing Signals"; and U.S. patent application Ser. No. 09/731,039, entitled "Systems, Methods and Devices for Trusted Transactions," filed Dec. 7, 2000, issued as U.S. Pat. No. 7,159,116. The previously identified patents and/or patent applications are hereby incorporated by reference, in their entireties.

In addition, this application hereby incorporates by reference, as if fully stated herein, the disclosures of U.S. Pat. No. 5,613,004 "Steganographic Method and Device"; U.S. Pat. No. 5,745,569 "Method for Stega-Cipher Protection of Computer Code"; U.S. Pat. No. 5,889,868 "Optimization Methods for the Insertion, Protection, and Detection of Digital Watermarks in Digitized Data"; and U.S. Pat. No. 6,078,664, entitled "Z-Transform Implementation of Digital Watermarks."

BACKGROUND OF THE INVENTION

1. Field of the Invention

The invention relates to the monitoring and analysis of digital information. Specifically, the present invention relates to methods and systems for open access and secured data objects.

2. Description of the Related Art

A number of fundamental issues discourage copyright holders from making their works available for general dissemination while ensuring payment for those works. This is especially the case for copyrighted works that may be digitally sampled and made available to open networks such as the World Wide Web. Various technologies have been proposed that serve to address specific problem areas. A synthesis of these technologies may represent a reasonable approach given the nature of networks and computation.

SUMMARY OF THE INVENTION

Therefore, a need has arisen for a method for open access and secured data objects that overcomes the deficiencies of the related art.

According to one embodiment of the present invention, a method for securing a data object is disclosed. The method includes the steps of (1) providing a data object comprising digital data and file format information; (2) embedding independent data into a data object; and (3) scrambling the data object to degrade the data object to a predetermined signal quality level. The steps of embedding and scrambling may be performed until a predetermined condition is met. The method may also include the steps of descrambling the data object to upgrade the data object to a predetermined signal quality level, and decoding the embedded independent data. The additional steps of descrambling and decoding may be performed until a predetermined condition is met. The predetermined condition may include, for example, reaching a desired signal quality of the data object.

According to another embodiment of the present invention, a method for distributing a data signal is disclosed. The method includes the steps of (1) providing a data signal comprising digital data and file format information; (2) selecting a first scrambling technique to apply to the data signal; (3) scrambling the data signal using the first scrambling technique, resulting in a first-level degraded data signal; (4) creating a first descrambling key for the first-level degraded data signal based on the first scrambling technique; (5) selecting a second scrambling technique to apply to the first-level degraded data signal; (6) scrambling the first-level degraded data signal using a second scrambling technique, resulting in a second-level degraded data signal; and (7) creating a second descrambling key for the second-level degraded data signal based on the second scrambling technique.

According to yet another embodiment of the present invention, a method for distributing a data object is disclosed. The method includes the steps of (1) providing a data object comprising digital data and file format information; (2) encoding independent authentication data into the data object; and (3) manipulating the file format information based on at least one signal characteristic of the data object.

According to still another embodiment of the present invention, a method for distributing data signals is disclosed. The method includes the steps of (1) embedding independent data into a data object; (2) scrambling the data object; (3) distributing the scrambled data object; (4) distributing a predetermined key that enables access to the data object; and (5) descrambling the scrambled data object with the predetermined key.

According to another embodiment of the present invention, a method for data signal distribution is disclosed. The method includes the steps of (1) applying a steganographic technique for embedding independent data into the data signal; (2) applying a scrambling technique selected from the group consisting of file format manipulation and partial encryption; and (3) generating a predetermined key.

According to another embodiment of the present invention, a method for bandwidth allocation is disclosed. The method includes the steps of presenting a plurality of data objects to a user, each data object having a security application, and linking at least a first data object to a second data object. The first data object may include, for example, advertising. A characteristic of the first data object may cause a change in the second data object.

According to another embodiment of the present invention, a system for securing data within a data object is disclosed. The system includes an embedder that embeds independent data into a data object; and a scrambler that scrambles the data object to degrade the data object to a predetermined signal quality level. The system may also include a descrambler that descrambles the data object to upgrade the data object to a predetermined signal quality level; and a decoder that decodes the embedded independent data.

According to another embodiment of the present invention, a system for distributing a data signal is disclosed. According to one embodiment of the present invention, the system includes a first selector that selects a first scrambling technique to apply to the data signal; a first scrambler that scrambles the data signal using the first scrambling technique, resulting in a first-level degraded data signal; a first key creator that creates a first descrambling key for the first-level degraded data signal based on the first scrambling technique; a second selector that selects a second scrambling technique to apply to the first-level degraded data signal; a second scrambler that scrambles the first-level degraded data signal using a second scrambling technique, resulting in a second-level degraded data signal; and a second key creator that creates a second descrambling key for the second-level degraded data signal based on the second scrambling technique.

DETAILED DESCRIPTION OF THE INVENTION

Figure 1:
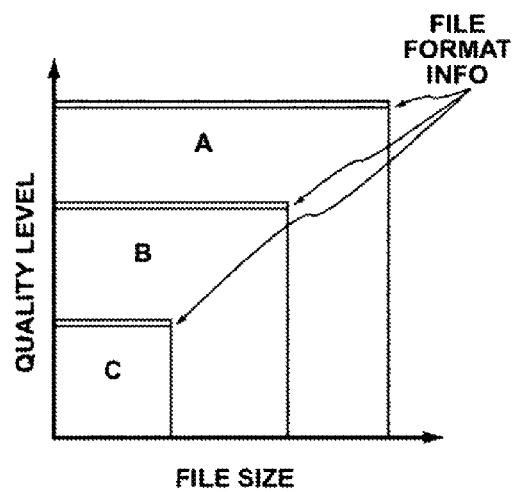
FIG. 1 is a diagram of a data object that has file format information where a decrease in file size corresponds to a decrease in signal quality according to an embodiment of the present invention.

Referring now in detail to the drawings wherein like parts are designated by reference throughout, there is illustrated in FIG. 1 a diagram of a data object that has file format information where a decrease in file size corresponds to a decrease in signal quality. For example, a DVD Audio signal has a larger file size than an MP3 recording and corresponding higher quality than the smaller sized file. This is applicable for any media file, including images, audio, video, and works that are multimedia in nature. The largest set of data in FIG. 1 corresponds to "A", the next largest to "B", and the smallest, for purposes of illustration, "C". Each of these sets represent predetermined signal quality levels. Each signal manipulation step may be governed by a predetermined key, partial key, session key, authorization key, public key pair, or the like, depending on the intended application. Keys may be used singularly or collectively.

In certain embodiments, as described herein, a user receives the entire data object but is only able to observe the object as limited by the quality and file size that might correspond to "C". For instance, an MP3 level of quality, though the ability to increase the signal quality to "A", perhaps corresponding to DVD-Audio quality, can be handled in real or near real-time. As discussed in the sample embodiments, streaming of media over networks, such as the Internet, or downloads of content can be supported.

Figure 2:
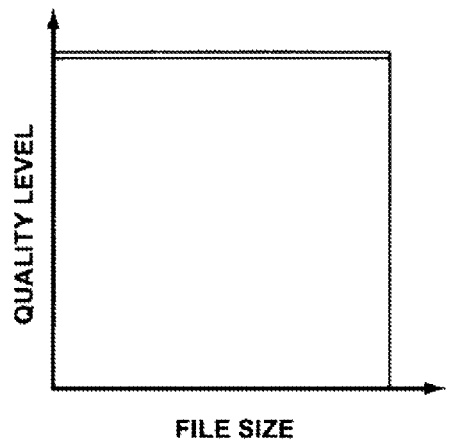
FIG. 2 is a diagram of a data object with file format information at a full quality signal level according to an embodiment of the present invention.

FIG. 2 corresponds to the manner in which the data object is distributed, without reference to the predetermined signal quality levels in FIG. 2. It may also refer to a separate and distinct data object that is linked to another data object. The logical associations between at least two objects may assist with determining the quality of either of the objects or both. The objects may represent trade-offs between signal quality or quantity, as well as payment, or even methods for advertising as discussed in the sample embodiments.

Figure 3:
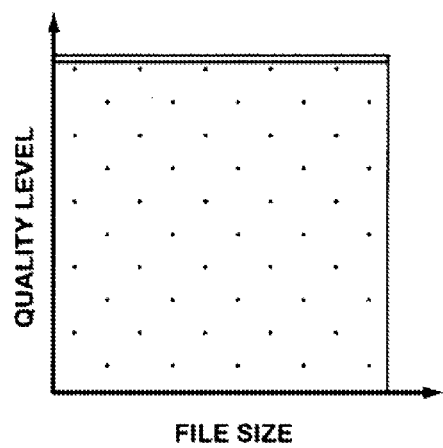
FIG. 3 is a diagram of a data object that has been embedded with independent data according to an embodiment of the present invention.
Figure 4:
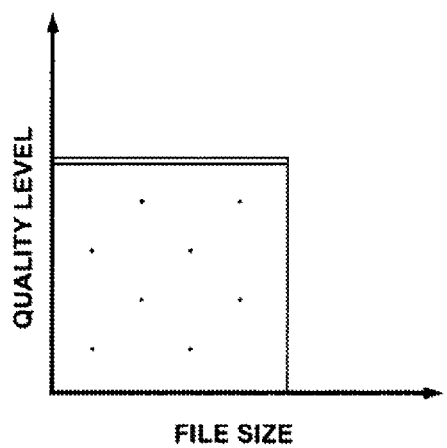
FIG. 4 is a diagram of a data object at a quality signal level that is less than that depicted in FIG. 2. The data object in FIG. 4 has a file size corresponding to fewer accessible embedded independent data according to an embodiment of the present invention.

FIG. 3 represents a data object at full quality that has been embedded with independent data. Because quality is a threshold for data embedding, different steganographic techniques may yield different quantity or quality of embedded independent data. As well, the type of media may have differences and such parameters as channel capacity for the media, the timing of processing or overhead, as well as overhead for handling the scrambling and de-scrambling can be flexibly supported. As the data object is scrambled, the embedded data is obscured. This does not mean embedded data will be erased, but fewer embedded data will be easily recoverable. This corresponds to FIG. 4. which is not shown to scale. It has been shown that robust open watermarks may be good candidates for resisting a wide range of signal manipulations, intended or unintended, and may serve as an appropriate baseline for of how much embedded data may be successfully embedded or detected. The inverse relationship between signal quality and the decrease in the number of detectable embedded data elements can be used to adjust quality levels of the data object or objects.

Figure 5:
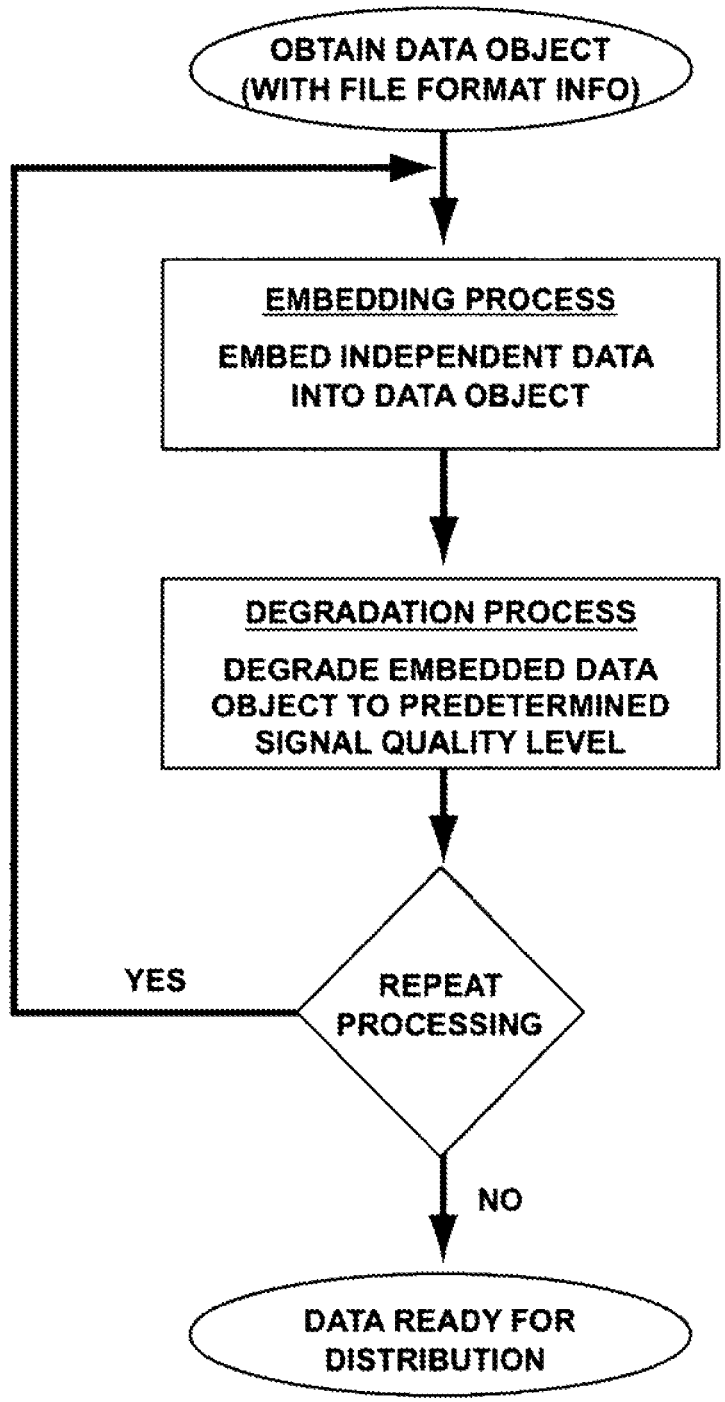
FIG. 5 is a block flow diagram for embedding and scrambling a data object according to an embodiment of the present invention.

FIG. 5 is a block flow diagram of a method of preparing data objects for distribution according to an embodiment of the present invention. First, a data object is obtained. Next, independent data is embedded into the data object. Third, the now embedded data object is degraded to a predetermined signal quality level. The process may be repeated to create more tiers of predetermined quality thresholds. The data object is then ready for distribution.

Cryptography is typically used to establish confidence, data integrity and nonrepudiation of data. The basis for cryptography lies in the difficulty of solving certain mathematical relationships that may exist between the uncoded message (i.e., "plaintext") and the coded message (i.e., the "ciphertext"). A difference between general coding schemes (which are used, for example, for storage and/or transmission of data) and cryptographic schemes is that cryptographic schemes involve the exchange of a "secret." Symmetric cryptographic protocols permit (for example, "plaintext") to be randomly encoded ("ciphertext") in such a manner so as to allow successful deciphering only with a secret, or "key." With symmetric ciphering, security is held in the key, which performs both encryption and decryption. What remains is the distribution, or sharing, and protection of the key. The key may be associated with unique, or independent, data, such as passwords or biometric information, to further cover the secret in a manner that may be individualized to users or devices capable of interpreting the unique data. The addition of unique data to the key serves to increase the computational complexity of discovering the secret.

Techniques have been developed to address the distribution of the key over public or unsecure communications channels. RSA uses such asymmetric cryptography in that a private or secret key is used for encryption, and a public key, (whose relationship with the private key can only be determined with great computational activity), is used to enable decryption. While public key cryptography also introduces the ability to carry out digital signature calculations to affix a signature to the decrypted output to assure nonrepudiation, the computational requirements of public key cryptography, including application of digital signatures, is thought to be relatively expensive for certain applications.

Depending on the security issue being addressed, cryptography may be used to secure communications channels or to establish the identity of users of a given communications channel. Signatures represent a further embodiment of tamper proofing data and there are a number of known specialized signature functions to achieve various goals (zero knowledge, one time, subliminal free, etc.). The issue of how to assimilate the ease and inexpensive nature of digital communications with secure forms of authentication is thus a problem for which many potential solutions exist. The digital copy problem, however, may be more appropriately addressed by combining cryptographic features with steganography. Steganography is the art of hiding something in plain view.

Efforts to introduce the data integrity features of cryptography with the data hiding features of steganography resulted in the advent of digital watermarking Digital watermarking, based on steganographic ciphering, uses the cryptographic benefits of key creation with perceptual coding schemes to tamperproof digitally sampled data. Such data may include images, audio, video, multimedia, etc. While cryptographic protocol ensures that the transfer of data may be successfully authenticated, only secure digital watermarking may uniquely identify the data object in a manner consistent with the characteristics of the data. Thus, watermark encoders will likely differ for different media objects.

The similarities between watermarking and signature schemes represent how changes or modifications of the data to be secured are mapped to an output. With perceptible data, perceptual compression limits the effectiveness of signatures as the compressed signal will perceptibly and accurately represent the original signal while reducing irrelevant or redundant data. Signature schemes are not traditionally directed at handling this limitation. Steganographic ciphering or signature generation based on steganography, however, is so directed. Robust digital watermarking, thus, has additional security limitations regarding the survival of the watermark and its relationship with the authentic signal. Combining a robust open watermark ("ROW") with a fragile or forensic watermark for the same digitized signal enables both robustness and security parameters to be met.

Some known methods for ensuring data integrity rely on how much access is provided to users. A problem exists, however, in that many data objects are available in formats that lack any protocol for access restriction or uniqueness (to assist in auditing copies). The benefits of widespread digital signal processing has reduced the assumption that the data objects need to come from authentic, or authorized, sources. Essentially, the reliance on bandwidth limitations to assure the security of large copyrighted files, such as music and video, has become moot as physically stored media is introduced to public networks such as the Internet. This is known as the digital copy problem, or "piracy."

A related problem is that many of the schemes once thought to handle this significant problem, under the rubric of digital rights management ("DRM"), are entirely dependent on the security of the access restriction protocol, while ignoring the ease at which "difference" attacks may be applied. A difference attack may be performed by comparing a common data object in secure (e.g., a watermarked CD) and unsecure (e.g., an unsecure, or legacy CD) formats to yield the secret key. Moreover, DRM solutions typically stop providing any level of access restriction when the data object is viewed or played by the user. Any claim to the contrary ignores the mathematical equivalence of ciphering with coding. Ironically, DRM solutions are increasingly designed with reduced computational requirements in order to meet economic realities. This means that cryptographic protocols are designed to handle secure communications, while digitally sampled copyrighted media is designed to be widely accessible. The ineffectiveness of bandwidth limitations to act as a "speed bump" for rampant unauthorized duplication and redistribution of copyrighted data is best demonstrated by the wild popularity of such file-sharing systems as Napster™, Gnutella, etc. The present invention provides an approach to combine various security techniques to address the need for open access of data objects while preserving data integrity and payment for the objects.

In cryptography, a number of techniques have been developed to address the difficulty of trusting a single entity with certain sensitive data. One technique, based on threshold cryptography, requires more than one entity to enable the decryption of data by breaking the decryption key into partial keys. For instance, sensitive financial information having an intendent risk for abuse with a single private key may be ameliorated by requiring more than one person to each provide a partial key in concert to decrypt the sensitive information. In steganography, the lack of present asymmetric embedding protocols, with the exception of nonlinear encoding techniques, is a direct result of the linearity of most perceptual coding schemes. Examples of such nonlinear encoding techniques are described in U.S. Pat. No. 6,078,664, entitled "Z-Transform Implementation Of Digital Watermarks," the disclosure of which is incorporated by reference in its entirety.

Cryptographic protocols may be used to increase data integrity in steganographic ciphers, as well as nonlinear coding schemes, such as those that may be described by z-transforms, and separation of watermark detection from decoding (as disclosed in U.S. Pat. No. 6,078,664 and pending U.S. patent application Ser. No. 09/456,319). Nevertheless, computational overhead may ultimately limit how much security can be directed on watermarking keys. As with threshold cryptography, transfer function-based key generation offers part of the solution for the present invention. This may be analogized to breaking secrets into parts that, when combined, yield the secret. The secret, or key, for a transfer function-based manipulation of a signal may be broken into parts to enable dynamic pricing models or models of payments more closely representative of a network of users. In this way, it may be beneficial to price data signals based on time or number of users seeking the same data objects but perhaps at varying quality levels or by extension payment profiles (subscription, download, a la carte).

Transfer functions represent a class of functions that relate input data to output data. As used in this disclosure, the term "transfer function" is used in the format sense, that is, to refer to that class of transfer functions that is used to format input data for meaningful communication. A particular format may be chosen to emphasize subjective or perceptible measures, or both. When stored in a particular format, the data may be said to have an inherent granularity based on the characteristics of the format. The transfer function can be used to manipulate, or scramble, the input data, for example, based on at least one signal characteristic of the data object. That is, the input data is scrambled in a way that manipulates the input data at a level of its inherent granularity in accordance with its transfer function. See U.S. patent application Ser. No. 09/046,627, filed Mar. 24, 1998, entitled "Method for Combining Transfer Function with Predetermined Key Creation," issued as U.S. Pat. No. 6,598,162, which disclosure is incorporated herein by reference.

Compression schemes may be optimized for any number of parameters, such as robustness, fidelity, speed, etc., and thus, due consideration must be given to the granularity of the data for the given format. The present invention seeks to manipulate data in a way that varies depending on the quality of the data being sought. Thresholds for this quality measurement enable robust models for security and payment as described herein.

Transfer functions can be used to manipulate data at the inherent granularity of the file format of the data. While formatting is intrinsically important, for many data operations, the formatting is a small subset of the overall data being represented. This is of concern because of the nature of how data is recognized in real world applications. For instance, radio broadcasts are freely accessible, but are delivered at a quality that is inferior to the original recording. For example, a song that is recorded on a Compact Disc may include frequencies ranging from 20 Hz to 22,000 Hz, but when played on a radio receiver, the reproduced song typically includes frequencies only in the range of about 300 Hz to about 16,000 Hz. Compact discs have a commercially-based market price, while radio broadcasts are "paid" for by advertising.

The difference in quality is not the sole determinant in how the audio signal may be valued. However, the ability to broadcast, or stream data, and enable discrete file sharing through the same communications channel, such as the World Wide Web, places the model of streaming and downloads in direct competition. Similarly, designing security to meet either model is a benefit of the present invention over the prior art. The reasoning behind such comparison, and, by extension, the benefits offered by the present invention, relate to how data is perceived by a potential audience of consumers. Additionally, the present invention contemplates the steps that need to be applied to assure that the link between perception and payment.

The inherent granularity of the file format of the data may be thought of as signal characteristics or signal features. The changes may be associated with a pseudo-random key, or a cryptographically-generated key or key pair, and may be distributed and handled by downstream parties using existing browser, viewer or player technologies. This is disclosed in U.S. patent application Ser. No. 09/046,627, entitled "Method For Combining Transfer Functions With Predetermined Key Creation," issued as U.S. Pat. No. 6,598,162, the disclosure of which is incorporated by reference in its entirety. A benefit of controlling the quality of a signal as it will be offered to a marketplace of participants may be an important consideration in determining pricing of the media. It is also a means for determining the quality threshold at which potential consumers may evaluate the data to make a purchasing decision. An important difference is that cryptography is not directed to the quality of the data, but only to access to the data.

The comparative computational benefit of subjecting a signal to transfer function-based security, where the key is permanently associated with the degraded signal, versus faster encryption, is related, indirectly, to the boosts in speed for probabilistic cryptography versus traditional cryptography. With transfer functions, the key is predetermined to having application to some aspect of how the signal is represented. With encryption, however, no such information exists in order to provide security to the ciphertext. Some speed improvements, such as those disclosed in U.S. Pat. No. 6,081,597, the disclosure of which is incorporated by reference in its entirety, regard the introduction of probabilistic approaches to cryptography in order to speed processing times for both encryption and decryption. This approach, however, may not be attractive because it introduces additional potential weaknesses for various mathematical properties.

What is clear is that information, as it is currently protected or secured, needs to have many approaches because, from a business perspective, it is unclear why some information achieves higher financial returns than other information. Assuring open access with security concentrated on the object, (as with watermarking), or concentrated on the fidelity, (as with transfer functions), may be more appropriate in view of the lost opportunities caused by access restriction with straight cryptography. Enabling the interaction of users and sellers to buy or trade value, held in keys, to increase the quality of data objects, is a more market-based approach to a problem for which few answers currently exist. As well, it provides for a more robust approach to understanding just what is demanded on a network, even in bandwidth terms, and enables a market-based approach to accurately charge for bandwidth and content or data objects exchanged on that bandwidth. The bandwidth is measured in bits per second, where higher valued bits increase the optimal pricing of that bandwidth, for any given instant of time.

A further difference is that any cryptography applied to a signal stream may not be related to the characteristics of the signal stream, or the channel for the signal stream, and thus may be more expensive to both the sender and receiver of the data. As well, the transfer function key is a function of the signal or how the signal will be distributed over a channel, so it may be easier to change the transfer function key than to replace the decryption software of receivers of the data. Intentional and intrinsic links between the granularity, or quality, of a signal and schemes for authentication or payment may also be used to enable threshold-based quality settings. Moreover, the transfer function may be handled by existing viewers or players because the format of the data is not changed, but only the quality of the material in the format is manipulated.

Examples of threshold-based security include subjecting a data signal to a transfer function-based manipulation associated with a cryptographically-generated key or key pair, and embedding unique, or independent, data in the signal stream that may be logically linked with the transfer function-based key. This combines transfer functions with steganographic embedding to force attacks on the signal being sought. The unique information may be short hashes that are both fast and assist in enabling payment of the signal stream upon purchase of the descrambling key. Each short hash could, for example, represent some predetermined value given some expectation that some of the hashes may be lost, but not to affect an overall pricing of the data object.

An example of this combination is as follows. A purchaser observing a scrambled signal stream (with predetermined quality manipulations based on the transfer functions applied) purchases a key. The key may be parameterized in a manner that is signal-specific. For example, planned broadcasts with prerecorded signals may be preanalyzed to enable a perceptible mask for hiding data. In addition, technology to buffer preanalysis for signals to enhance the processing speed of a subsequent likely request of a previously preanalyzed signal may be used. The signal may also be preanalyzed for levels of degradation based on specific transfer functions applied to the signal. Channel or time specific parameters, similar to session keys as practiced in cryptography, may be similarly utilized where channels have different data objects with different signal-based characteristics that may be grouped more efficiently, such as video and audio. Time-specific parameters may simply foster differences between those objects that are relatively high in demand at a given time. Additionally, popular pay-per-view systems may be enabled with time dependent parameters. Similar to session keys disclosed for ensuring secure channels (SSL), sessions key applied to information may increase security or enable discrete payments to be made for various distributed data objects.

One way to measure the threshold of payment is to measure a unit of payment against the ability to steganographically embed enough information to perform a successful authentication of payment information. Signature schemes are generally computationally expensive by orders of magnitude versus message authentication codes or one-way hashes. Given a relationship between the perceptibility of a signal and the available space for successfully hiding authentication data, a tampered signal stream may suffer both further quality degradation and a failure of the authentication protocols supporting payment mechanisms. Any inverse relationship between the signal quality and the decrease in the detectable number of payment-based hashes may be used to adjust signal quality parameters with payment parameters. Reasonable estimations for the cost and expense of embedding hashes, which may be quickly authenticated and reliably associated with payment, have been demonstrated in a variety of known micropayment schemes.

Digital signatures may also be incorporated at a higher computational cost to the overall system implementation (e.g., MicroMint, PayWord). See Security Protocols, International Workshop Cambridge, United Kingdom Apr. 10-12, 1996, Lecture Notes in Computer Science, Vol. 1189 (Mark Lomas ed.). These schemes, however, do not integrate signal quality generally with payments. Embedding is largely ignored.

The embedding and scrambling may have some logical relationship that may form the basis of an allocation of bandwidth or even a means of establishing a price for the object, or a demand for the object. Both techniques provide a robust framework for authenticating and verifying the object's quality, as well as how the network may dynamically adjust the pricing of the overall bandwidth/objects being demanded by users.

When a given signal contains relatively little noise, there is less space for information hiding, and a payment metric may be adjusted for commercially valued signals prior to broadcast to estimate a fair payment model based on measures of successful steganographic embedding of the payment information in discrete units of time. When a given signal contains relatively high noise, adjustments over the payment metric may be made. Alternatively, or in combination with embedded payment information, the distortion introduced by a transfer function may be logically associated with the payment and stored in a general session key, or in a series of keys propagated from the sender to the receiver in a discrete series. The receiver may be required to establish credentials for payment in addition to an identity for material that is deemed to require prior authorization by the sender. Alternatively, the material may be intended for an audience at a particular quality setting that is commercially free (e.g., "AM radio quality"). As another alternative, any of the audience members may purchase keys that have a logical relationship with predetermined commercial pricing (e.g., "CD quality" or live concert event). The present invention anticipates flexible pricing, open access of signal streams and measured relationships with the quality of the signal in the stream. Any channel-based or time-based restrictions on a given implementation may be flexibly manipulated to achieve either better pricing or receiver-sensitive demands to given data objects.

Essentially, the streamed data is openly accessible to any potential consumer at a degraded quality (e.g., there is "open access" to the streamed data in a scrambled or slightly scrambled state). Further, payment data or other such independent data is securely embedded within the stream (i.e., there may be secured data hidden within the data stream). Both embedding and scrambled state-dependent settings are contemplated by the present invention. Purchase of the descrambling key introduces a change to the authentication or payment data stream and enables immediate streamed payment to be initiated. Where streamed payment is not preferred, single payments or installment payments in credit or debt are also possible with embodiments of the present invention. Establishing a unique identifier for the user or payment means, such as linking to a phone bill, credit card or alternative payment facility, may provide additional credentials for the seller to use.

The benefits of such a system (e.g., improved estimation of demand for a particular data object, reduced cost of security because of the open-access nature of the data objects, the ability to link quality to payment) are obvious given the difficulty in assessing the commercial value of any given data object, especially where the data object may be made available in a variety of quality settings, live or prerecorded, or demand-based access limitation (essentially, a direct correlation with requests for a given data object or object stream and the cost of "handling" all requests). For example, discrete data objects may have a variety of quality levels, ranging from an encrypted version (low quality) to commercial grade quality. The quality levels may be predetermined, and may also include embedded data, which may have a variable detection rate based on the predetermined quality threshold. In addition, the present invention provides a tighter, more granular estimation of data object demand, as well as a clearer estimation of how a network can be optimized to realize commercial returns. All of this makes it so that different quality levels, different objects, differential object treatment for objects, which may be advertising instead of the content sought (for those situations where the channel may have a fixed dimension and part of the that fixed dimension includes data objects not being sought but being provided to pay for the object or objects being sought—this is called secondary or advertising-based data), yield-based pricing and demand given that the objects may be available in less-than-commercial grade quality instead of no access whatsoever for systems in the art.

The present invention also permits greater flexibility. For instance, the transfer function may be engineered to reduce perceptible artifacts as more people choose to pay. In other words, as more consumers pay, the overall level of quality of the stream increases. In another example, the scrambled states may be preset to make adjustments as users make payments for descrambling keys. Alternatively, threshold-like application of the transfer function may enable true market-based pricing of a particular signal or signal stream as access is unfettered to the initially, but intentionally, degraded signal. Moreover, the link with bandwidth costs, which may serve as a floor for the overall pricing of the objects being offered, may constitute part of the embedded authentication data prior to purchase (by the user's decision to acquire a descrambling key).

In the case where the data is unknown, such as with new copyrighted material, it may be impossible to combine the signal degradation features of transfer functions if all of the data in a signal stream are subjected to cryptographic ciphering as is currently a predominant feature in the prior art. The material is all treated equally and thus the lowest common denominator is security with encryption and access restriction. Differential access is not possible based on signal quality measures and encrypting individual objects is a greater overall cost paid in the computational complexity of full encryption versus transfer function-based manipulations. The present invention uses transfer functions as a low-cost means for enabling open access to varying data objects, albeit in a downgraded level of quality intrinsic to the characteristics of the data, so as to allow for purchase decisions that may be made "on-the-fly." Another baseline may be made for the embedding features contemplated herein. The advent of robust open watermarks represents a fairly good representation of how a watermark may survive given a wide breadth of signal manipulations and subjective imperceptibility measures. A ROW may be engineered to survive up to the limit of the signal quality expected, including perceptual coding (e.g., MP3, AAC, etc.), and may serve as a baseline for the least amount of quality for a given signal intended for streaming. Essentially, the signal quality may be represented as that quality for which a ROW, which survives a predetermined number of signal manipulations, may be successfully embedded and detected.

The purchase is the equivalent of the receipt of the cryptographically generated transfer function-based key, or public key, by the user. The key may be dependent on the channel, as a session key for rendering the channel at a pre-transfer function state, where all objects in the channel are deemed equivalent, as with a concert broadcast, or predetermined quality, where some objects are less degraded, or not degraded, to encourage user interest in the channel.

The present invention may also be used to scramble particular data objects within a stream that offers higher quality in the stream (e.g., high definition television versus satellite television) than is otherwise available in other predetermined formats (e.g., standard NTSC quality material of the same television broadcast, or even differences between live versus prerecorded material). Scrambled and unscrambled objects may be streamed in the same channel without the need for expensive cryptographic operations. Embedding authentication information in the stream, or including authentication information in the descrambling key, is economically inexpensive while being intrinsically dependent on the signal being sought.

The decision to use such data scrambling instead of full-blown encryption represents a decision to handle data objects as they are, not as the channel handles data absolutely. Thus, the choice of transfer function-based scrambling may be less prone to generic attacks on an encryption system that addresses data, but does not address data characteristics. Encryption systems may suffer implementation weaknesses if a general encryption method encrypts each data object independent of a comparably inexpensive coding system. Thus, for each encrypted object, there is an underlying coded element that has either been "wrapped" by an encryption function, a file extension, or that each coded element is encrypted, independent on the underlying coding scheme. Hacks will be focused on the objects as they are decrypted without any penalty paid on the data object or its quality (represented in signal features or characteristics based on characteristics, such as, frequency, time, spatial, or bit depth). Total Recorder, Audio Jacker and similar applications simply route decrypted signal outputs to unsecure locations in a receiver's general computing device, without the encryption. Comparisons with the previously encrypted stream are now computational easy to enable generalized hacks of the system keys.

Distributing security both perceptibly and imperceptibly is largely missing from the art. If encryption is expensive, it must offer a level of security consistent with that value. Authentication protocols need not be expensive in comparison to the coding scheme used by the receiver. Additionally, the present invention allows for considerations to be made for transfer functions that are bound by a communications channel (a higher number of channels may be utilized with smaller bandwidth requirements, but may also reduce the audience experience for each channel by lowering overall quality). To address this issue, a data object may be preanalyzed to map any manipulations, given demand in the channel, to the coding scheme for which the channel is designed. If partial encryption is deemed a better security fit, instead of transfer functions, an encryption scheme that typically has no relationship with the scrambling of data given signal features or characteristics may be applied. Fast encryption schemes, such as elliptic curve or those disclosed in U.S. Pat. No. 6,081,597, are good candidates.

Data objects may be communicated efficiently given an estimation of bandwidth resources. The trade-off among the size of the data objects, bandwidth capacity in available channels, and accessibility by receivers of the data objects create parameters for cost and performance. Depending on what data is broadcast in a stream, a variety of security protocols may be desired. Copyrighted material seeks the highest economic value by first reducing the cost of distribution, and then ensuring as much payment as possible. The cost of distribution is a function of both recognition and accessibility. Material that is demanded may not be communicated efficiently over networks for which senders and receivers have limited bandwidth (defined as bits per second, or data per discrete unit of time) prior to those users dropping from the system and potentially choosing not to make any purchase. Alternative means for accessing the material, including purchasing the material in a physical format that handles the bandwidth limitations more effectively (e.g., a prerecorded DVD), act as a physical representation of the bandwidth resources necessary to satisfy consumers. The devices that are designed to store the encoded objects may be configured to handle the embodiments of the present invention. Alternatively, markets exist for distribution of material in downgraded formats as a result of bandwidth limitations. Examples, such as Real Networks or Microsoft Media Player applications, offer material in formats that have lower absolute quality than that offered by such physical media packaging as CD and DVD. There also exist proprietary networks with higher channel capacity, such as cable television or satellite.

The problems of securing a stream of data are similar to securing a stored or fixed representation of the same. U.S. Pat. No. 6,009,176, the disclosure of which is incorporated by reference in its entirety, offers a means for propagating a signature calculation across a stream of data. The computational cost of generating the signature is reduced as the authentication features of the signature, or additionally generated one way hashes, in the stream are propagated as ancillary data. Essentially, a hash from a successive block of streamed data is embedded in the current block. The evident weakness of this technology is the computational overhead of signature propagation. While it is less intensive than discretely signing individual blocks, the weakness of authenticating a stream of data intended for broadcast is related to the inability to prevent the ancillary authentication information from being stripped. A more appropriate application of authentication trees, where an initial hash may apply to any of the children data, at lower computational cost, is the scrambling of data objects by transfer function. Application of such authentication in the stream of data itself is the basis of steganographic ciphering disclosed elsewhere in the art, including inventions by the present inventor.

A similar general observation is that authentication may be handled in a rudimentary way by observing any damage to an outputted stream. Similarly, crude authentication is possible when observing noisy, unpaid, cable television broadcasts. Dissimilarly from the present invention, it is believed that the application of data object specific scrambling, applicable to a streaming channel, affords rightsholders an extra measure of security in the absolute. For example, the threshold for dissuading consumers from observing media in downgraded formats has been historically inadequate. Second, it is assumed, arguendo, that observation is more likely to lead to purchase for a number of applicable markets. However, making data objects uniquely secure is less computationally expensive than a blanket application of any authentication or security scheme meant to address the most determined attacks for several reasons. For instance, not all objects are valued equally, and thus variable security protocols reduce the burden on aggregators or sellers of said objects. Next, quality has always been used to encourage recognition and purchasing of data objects such as media-rich content. Further, channels may be spilt between data objects intended for the channel matched with advertisements that are typically secondary in value to the user. The ability to mix the quality of both primary and secondary data objects being delivered to users in real time enables additional flexibility in pricing and service offerings to markets for data. Lastly, the present invention seeks to tie layered security, while enabling open access, so as to reduce the potential for system-wide failure. By addressing each data object in context with the means for availability to potential consumers the purchasing experience may be enhanced in a manner consistent with existing markets for informational goods. This includes teasers, try-before-you buy, downgraded samples, combinations of content with advertising in the same channel, etc.

Sample Embodiments

In order to better appreciate and understand the present invention, the following sample embodiments are provided. These sample embodiments are provided for exemplary purposes only, and in no way limit the present invention.

Sample Embodiment 1

Although this sample embodiment may be described in relation to digital music and video, it should be noted that the present invention is not so limited.

According to one embodiment of the present invention, a secured data object that may contain digital music or video, or both, may contain independent data embedded within. For purposes of this embodiment, digital music having an initial signal quality level equivalent to that of a compact disc is provided.

Independent data, which may include authenticatable data, such as a robust open watermark, may be embedded into the digital music. This may be accomplished by any known technique. The digital music is then scrambled in order to obscure embedded data. The scrambling also degrades the signal quality of the digital music.

The scrambling may be used to degrade the signal quality by a predetermined amount. For example, the scrambling may decrease the signal quality one step, or level, such as from CD quality to MP3 quality; MP3 quality to FM quality; FM quality to AM quality; and AM quality to telephone quality. For video, this may include, inter alia, NTSC quality, QuickTime quality, Macrovision quality, satellite quality, and DVD quality.

The steps of embedding independent data and scrambling the digital music may be repeated as desired until a predetermined condition, such as a desired signal quality level, is reached.

In one embodiment, the digital music may be distributed to users with a degraded signal quality in order to promote the digital music. For example, users may be able to download the digital music with a degraded signal quality (e.g., telephone quality, AM radio quality, etc.) for free in order to evaluate the music. If the user likes the music, the user may purchase the ability to upgrade the signal quality level of the digital music. This may be done in steps (e.g., from telephone quality to AM radio quality, then AM quality to FM quality, etc.) or it may be done in one instance (e.g., telephone quality to CD quality).

Keys may be used to upgrade the signal quality. As a user purchases a key, the key is used to decode the independent data from the digital music. This data may include payment information.

The keys may be used singularly, or they may be used collectively. When used singularly, a key may be used by an individual user to increase the signal quality of the digital music, or a key may be used to initiate a session key-based timing mechanism. In the latter situation, the session key may provide a user with a unit of time of high quality digital music.

When used collectively, the keys may be used to increase the signal quality of the digital music for a group. For example, as more users purchase keys to decode the music, the signal quality of the digital music is upgraded for all. In addition, the keys may be pooled to initiate a session key-based timing mechanism.

The pricing of the keys may be based on several pricing models. For example, factors, including, inter alia, signal quality, bandwidth required to transmit the digital music, etc., may be used in determining the pricing of a key.

Sample Embodiment 2

Several companies give consumers the option of receiving advertisements in lieu of making a direct payment for the services that the companies provide. Examples of these services include EverAd for music, NetZero and Juno for Internet access, etc. The present invention provides a way to bridge a pay service with an advertisement delivery service, to create an individual mix for each consumer.

At a base quality level, the user may be required to view a complete advertising package, using the maximum amount of screen space available. As the user pays for increased quality levels, the quantity and size of the advertisements decrease, until at full quality and/or full payment the advertisements disappear. The quality/advertisement ratio may be individual for each data object as well as each consumer.

This embodiment offers several significant advantages. First, the pricing of the system may be optimized for each object individually. Second, the advertisements may be served as a stream, which may necessitate the consumer to periodically connect to the ad server, thus maintaining the integrity of the data objects and allowing for regular key switching.

Sample Embodiment 3

Pay-per-view streams are one of the ways in which cable and satellite providers create additional revenue from their existing bandwidth. The present invention provides the ability to offer a pay-per-view event at a degraded quality until a key purchase was made. Each key purchase incrementally increases the quality of the stream. Additionally, the keys may be switched at predetermined intervals, such as 1 second, to allow higher quality "teasers" to induce purchase. For example, a consumer may view a one-time preview at the higher quality for 1 or 2 minutes by receiving the relevant keys. This may entice the consumer to purchase the higher quality stream.

Sample Embodiment 4

The present invention may provide the ability to combine several separate channels into a single window. According to one embodiment, a plurality of channels or data objects with varying applications of security may be provided to a web browser. An example of such includes a web browser with a channel of scrambled audio, watermarked advertising, and watermarked images that may be viewed and/or listened to by the user.

The advertising may be linked to the audio channel in a manner that is different from radio advertising. For example, the advertising channel may have a logical link to the audio stream. A user may purchase a higher quality audio signal by purchasing session keys that are linked to the scrambling state or to the embedded watermarks. The session keys may represent payments. Either one of the session keys, or the session keys collectively, may yield authenticatable data, embedded hashes or data related to the descrambling key(s), which may be converted in a logical manner, such as a payment estimator or "yield"-type measure, to dynamically adjust the overall payment for the channel in question.

Each channel may have different data object elements, and may be different for each user. The common thread for the channel may simply be the channel name. Thus, some channels may have data objects that have primary value (content) and secondary value (advertising), or may contain a specific media type (e.g., video, audio, etc.).

The yields may be personalized for a user given the fact that certain entities or aggregators of content may have many different data objects to offer in a maximal mix that appeals to individuals or markets. In one embodiment, certain media types may have a better yield (measured in bits/second) than other media types. An example of this is digital music versus digital video. Digital video generally has a certain number of bits, while digital audio has a different number of bits. The market prices for these media types are different and the time or times consumers choose to listen or view means that the value in bits/second is different. Similarly, an advertisement has a certain bandwidth profile that is measured in terms of pricing given marketing parameters.

To the user, it is all an allocation of bandwidth given that consumers have a fixed amount of time and money to decide which media types and how much fidelity or discreteness (media size) the user should choose in either real time, as with a network, or in fixed prerecorded units (CDs, versus DVDs, versus recording media to handle MP3, all different media sizes given resources available to consumers and how a media company decides to occupy the bits).

Sample Embodiment 5

Network optimization protocols, including such technologies as caching and store and forward models for handling the allocation of bandwidth, or more particularly data objects, are based largely on estimating demands for data objects by a plurality of users who may be connected to the network in variety of ways. These users may have differing demands based on connection speed and other limitations for accessible bandwidth. The ability to dynamically handle the keys described in the present invention, including scrambling and embedding in some predetermined manner, also serves to enable network operators to better determine what quality levels are sought on a per data object basis, and how payments can be estimated, given user requests for keys that link quality and payment to the objects themselves. The variety of data objects, based on media type and bandwidth (measured in terms of bits per second and some predetermined quality level), is constantly monitored to assure the best use of bandwidth for any given network. By extension, the present invention enables any existing network to be based more closely on dynamic pricing models and dynamic handling of data object dependent or channel based keys to establish real time quality levels sought but those with access to the network.

Other embodiments and uses of the invention will be apparent to those skilled in the art from consideration of the specification and practice of the invention disclosed herein. The specification and examples should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

What is claimed is:

1. A method for streaming media over a network, comprising:

receiving in a first device an openly accessible data object comprising digital data and file format information;

said first device embedding independent data into the openly accessible data object and then scrambling the openly accessible data object to perceptibly degrade the openly accessible data object to a predetermined signal quality level where at least a portion of the independent data can be decoded from the scrambled openly accessible data object;

said first device repeatedly performing the steps of embedding and scrambling until a predetermined condition is met wherein the predetermined condition comprises reaching a desired signal quality level of the openly accessible data object, the repeated steps resulting in generation of an openly accessible data object having the desired signal quality;

said first device transmitting said openly accessible data object having the desired signal quality over a network;

a second device receiving over the network a signal stream comprising the said openly accessible data object having the desired signal quality;

said second device receiving a first key;

said second device applying a key based descrambling algorithm which takes as inputs at least one key and a signal stream and produces as output a descrambling algorithm output signal, to said first key and said signal stream, to produce a signal stream descrambling algorithm output signal; and said second device generating at least one of an audible and a visual signal, based upon said signal stream descrambling algorithm output signal.

2. The method of claim 1 wherein said first key is parameterized to be signal specific to said signal stream such that application of said first key by said key based descrambling algorithm to said signal stream results in at least partial descrambling.

3. The method of claim 1 further comprising:
receiving in said second device a second key;
wherein said second device applying comprises said key based descrambling algorithm taking as input said second key.

4. The method of claim 1 wherein said first key provides a mapping to independent data, which independent data is distinct from said content, and which independent data is embedded in said signal stream, and said key based descrambling algorithm uses said first key to locate said independent data.

5. The method of claim 4 wherein said independent data comprises payment data indicating authorization to charge an account.

6. The method of claim 1 further comprising:
said second device decoding independent data, which is data independent of said content and contained in said signal stream, from said signal stream.

7. The method of claim 6 wherein said independent data comprises payment data indicating authorization to charge an account.

8. The method of claim 1 wherein said first device generates a plurality of openly accessible data objects each having said desired signal quality by repeatedly performing the steps of embedding and scrambling on each of this plurality of openly accessible data object, and transmitting the results of this processing over the network, in said signal stream.

9. The method of claim 8 wherein said signal stream comprises a plurality of channels and said second device receiving comprises said second device receiving different ones of said plurality of objects from different ones of said plurality of channels.

10. The method of claim 1 wherein said scrambling comprises manipulating file format information and said descrambling comprises descrambling the scrambled file format information.

11. A system for streaming media over a network, comprising:
first device designed to receive an openly accessible data object comprising digital data and file format information;

said first device designed to embed independent data into the openly accessible data object and then scramble the openly accessible data object to perceptibly degrade the openly accessible data object to a predetermined signal quality level where at least a portion of the independent data can be decoded from the scrambled openly accessible data object;

said first device designed to repeatedly perform steps of embedding and scrambling until a predetermined condition is met wherein the predetermined condition comprises reaching a desired signal quality level of the openly accessible data object, the repeated steps resulting in generation of an openly accessible data object having the desired signal quality;

said first device designed to transmit said openly accessible data object having the desired signal quality over a network;

a second device designed to receive over the network a signal stream comprising the said openly accessible data object having the desired signal quality;

said second device storing in memory a first key;

said second device designed to apply a key based descrambling algorithm which takes as inputs at least one key and a signal stream and produces as output a descrambling algorithm output signal, to said first key and said signal stream, to produce a signal stream descrambling algorithm output signal; and said second device designed to generate at least one of an audible and a visual signal, based upon the signal stream descrambling algorithm output signal.

12. The system of claim 11 wherein said first key is parameterized to be signal specific to said signal stream such that application of said first key by said key based descrambling algorithm to said signal stream results in at least partial descrambling.

13. The system of claim 11 further comprising:
said second device storing a second key;
wherein said second device designed to apply said key based descrambling algorithm taking as input said second key.

14. The system of claim 11 wherein said first key provides a mapping to independent data, which independent data is distinct from said content, and which independent data is embedded in said signal stream, and said key based descrambling algorithm uses said first key to locate said independent data.

15. The system of claim 14 wherein said independent data comprises payment data indicating authorization to charge an account.

16. The system of claim 11 further comprising:
said second device decoding independent data, which is data independent of said content and contained in said signal stream, from said signal stream.

17. The system of claim 16 wherein said independent data comprises payment data indicating authorization to charge an account.

18. The system of claim 11 wherein said first device generates a plurality of openly accessible data objects each having said desired signal quality by repeatedly performing the steps of embedding and scrambling on each of this plurality of openly accessible data object, and transmitting the results of this processing over the network, in said signal stream.

19. The system of claim 18 wherein said signal stream comprises a plurality of channels and said second device receiving comprises said second device receiving different ones of said plurality of objects from different ones of said plurality of channels.

20. The system of claim 11 wherein said scrambling comprises manipulating file format information and said descrambling comprises descrambling the scrambled file format information.

* * * * *